United States Patent
Duong et al.

(10) Patent No.: US 10,127,307 B2
(45) Date of Patent: *Nov. 13, 2018

(54) SEARCHING ALTERNATIVE DATA SOURCES

(71) Applicant: International Business Machines Corporation, Armonk, NY (US)

(72) Inventors: Quang T. Duong, Austin, TX (US); David M. Gordon, Morrisville, NC (US); David L. Schmidt, Cary, NC (US); Scott A. Will, Wake Forest, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/217,671

(22) Filed: Mar. 18, 2014

(65) Prior Publication Data

US 2014/0207807 A1    Jul. 24, 2014

Related U.S. Application Data

(63) Continuation of application No. 13/687,270, filed on Nov. 28, 2012.

(51) Int. Cl.
*G06F 17/30* (2006.01)

(52) U.S. Cl.
CPC .... *G06F 17/30634* (2013.01); *G06F 17/3002* (2013.01)

(58) Field of Classification Search
CPC .......... G06F 17/30247; G06F 17/3079; G06F 17/30796; G06F 17/30011; G06F 17/30424; G06F 17/30; G06F 17/30787; G06F 17/21; G06F 17/30023; G06F 17/30244; G06F 17/30746; G06F 17/30864; G06F 3/0481; G06F 17/30554; G06F 17/30126; G06F 17/30477; G06F 17/3053; G06F 17/30696; G06F 17/30702; G06F 17/3084;
(Continued)

(56) References Cited

U.S. PATENT DOCUMENTS 6,487,404 B1   11/2002 Kransmo et al.
7,752,220 B2   7/2010 Weyand et al.
(Continued)

OTHER PUBLICATIONS

Google, "Laptop backpack", http://www.google.com/search?hl=en&tbm=shop&q=laptop+backpack&oq=laptop+backpack&aq=f&aqi=g10&aql=&gs_sm=3&gs_upl=61414l65645l0l65861l1l5l1l5l0l5l5l0l19 51l103417.311010, accessed on Jan. 20, 2015.
(Continued)

*Primary Examiner* — Scott A. Waldron
*Assistant Examiner* — Andalib F Lodhi
(74) *Attorney, Agent, or Firm* — Reza Sarbakhsh

(57) ABSTRACT

A method and system for searching alternative data sources include monitoring a first communications source broadcasting unstructured data, and a second communications source broadcasting structured data. The method further includes generating text from the unstructured data and from the structured data collected, and parsing the generated text. The method also includes defining a search phrase, and analyzing the generated or parsed text for semantically relevant text in relation to the search phrase. The method also includes selecting the semantically relevant text.

5 Claims, 3 Drawing Sheets

(58) Field of Classification Search
CPC ........... G06F 17/30991; G06F 17/2247; G06F 17/2705; G06F 17/272; G06F 17/3089; G06F 17/30634; G06F 17/3002
USPC ........................................ 707/755, 769, 803
See application file for complete search history.

(56) References Cited

U.S. PATENT DOCUMENTS

| | | | |
|---|---|---|---|
| 7,765,564 B2* | 7/2010 | Deng | H04H 60/33 725/10 |
| 7,844,602 B2 | 11/2010 | Katwala et al. | |
| 8,167,725 B1* | 5/2012 | Patnaik | H04N 21/4758 463/40 |
| 8,255,948 B1* | 8/2012 | Black | H04N 21/234336 709/219 |
| 8,296,302 B2* | 10/2012 | Qiu | 707/739 |
| 8,385,588 B2* | 2/2013 | Jacoby et al. | 382/100 |
| 8,606,627 B2* | 12/2013 | Konig | G06Q 30/02 709/200 |
| 8,700,599 B2* | 4/2014 | Udupa | G06F 17/30663 707/709 |
| 8,805,689 B2* | 8/2014 | Ramaswamy et al. | 704/273 |
| 8,972,840 B2* | 3/2015 | Karas | G06F 17/30855 704/253 |
| 2002/0002709 A1* | 1/2002 | An | H04N 7/17309 725/109 |
| 2002/0056004 A1* | 5/2002 | Smith | G06Q 40/04 709/227 |
| 2002/0122656 A1* | 9/2002 | Gates | G11B 27/034 386/214 |
| 2003/0172368 A1 | 9/2003 | Alumbaugh et al. | |
| 2004/0128688 A1 | 7/2004 | Seo | |
| 2005/0120009 A1* | 6/2005 | Aker | 707/3 |
| 2005/0160459 A1 | 7/2005 | Mashimo et al. | |
| 2006/0059277 A1 | 3/2006 | Zito et al. | |
| 2007/0008845 A1 | 1/2007 | Takada | |
| 2007/0294722 A1 | 12/2007 | Kang et al. | |
| 2008/0100488 A1* | 5/2008 | Felder | H04R 5/04 341/144 |
| 2009/0119172 A1* | 5/2009 | Soloff | G06Q 30/02 705/344 |
| 2009/0150158 A1 | 6/2009 | Becker et al. | |
| 2009/0205000 A1* | 8/2009 | Christensen | H04N 21/8456 725/61 |
| 2009/0253110 A1* | 10/2009 | Hurtado | 434/307 R |
| 2011/0029563 A1 | 2/2011 | Coiera et al. | |
| 2011/0063317 A1* | 3/2011 | Gharaat | G06Q 30/0244 345/545 |
| 2011/0289099 A1* | 11/2011 | Quan | 707/769 |
| 2012/0147204 A1 | 6/2012 | Jeong et al. | |
| 2012/0191231 A1* | 7/2012 | Wang | G06F 17/30743 700/94 |
| 2012/0198335 A1* | 8/2012 | Huang | G06F 17/30867 715/716 |
| 2012/0296646 A1 | 11/2012 | Varthakavi et al. | |
| 2012/0330973 A1* | 12/2012 | Ghuneim et al. | 707/748 |
| 2013/0159222 A1* | 6/2013 | Blanco | G06F 17/30696 706/12 |
| 2014/0019128 A1* | 1/2014 | Riskin | G06Q 10/06 704/235 |
| 2014/0207807 A1 | 7/2014 | Duong et al. | |

OTHER PUBLICATIONS

Parsons, J. et al, "Property-based semantic reconciliation of heterogeneous information sources", ER 2002, pp. 351-364, 2002.

Spaccapietra, et al, "Conceptual Modeling" ER 2002, 21st Conference, Oct. 7-11, 2002.

IBM, "System and Method for Efficiently Searching Similar Semantic Expression Set", http://www.ip.com/pubview/IPCOM000180722D, Mar. 16, 2009.

IBM, "Method and System for Achieving Fast Response Time Using Data Semantic Relationships for Information Services that Federate Large Number of Data Stores Storing Massive Interrelated Data", http://www.ip.com/pubview/IPCOM000180756D, Mar. 16, 2009.

Duong et al., Pending U.S. Appl. No. 13/687,270, filed Nov. 28, 2012, entitled: "Searching Alternative Data Sources".

* cited by examiner

SEARCHING ALTERNATIVE DATA SOURCES

CROSS-REFERENCE TO RELATED APPLICATIONS

This application is a continuation of U.S. patent application Ser. No. 13/687,270, filed Nov. 28, 2012, which is hereby incorporated by reference in its entirety.

FIELD OF THE INVENTION

The present invention relates to a method and system using a computer for searching alternative data sources.

BACKGROUND OF THE INVENTION

Current searching methods and systems use different types of search techniques (sometimes referred to as "search bots"), configured to search through digital information sources with an online presence. These search bots may be configured for general purpose searches, or configured for a more specific purpose. Additionally, the search bots may be deployed on the Internet. For example, an internet search engine may include a search portal accessible through a browser, presenting its users with a shopping option. Users can enter a search phrase in the search portal. The search engine searches its databases for information relevant to the entered search phrase, and displays the search results. The same configuration can be deployed on a local network, or even on a single computer.

A characteristic of databases used by current searching methods and systems is that they contain ready to search digital information. For example, in the case of an internet shopping search bot, information in the databases searched may include digital pricing data that is compiled manually, compiled by the search bot crawling online retailer websites, or compiled using a retailer's web services.

SUMMARY OF THE INVENTION

Current search techniques are limited because they fail to incorporate valuable sources of information that do not have a searchable online presence. For example, a user searching for the lowest price on a backpack will not have access to pricing information that is advertised exclusively on radio, television, or in a print catalogue. Not only might the overlooked pricing information be relevant, it may be the most important information to the user. The present invention substantially improves results of a search by returning a higher volume of relevant information, including information that may be the most relevant to the search.

According to an aspect of the invention, a method for searching alternative data sources includes a computer having a processor for executing a software program embodied on a data storage device operatively connected to the computer. The steps of the program include the following: monitoring a communications source that broadcasts unstructured data; converting the unstructured data, collected through the monitoring step, to structured data; processing the converted unstructured data to generate text from its non-textual elements; storing the text on a searchable data storage device; defining a search phrase; semantically analyzing the text for semantically relevant text in relation to the search phrase; and selecting the semantically relevant text.

In another aspect of the invention, a computer system for searching data sources, includes a computer having a processor, a computer readable memory, and a computer readable storage device, operatively connected to one another. The system further includes a communications source that broadcasts unstructured data; and a network for communicating between the computer and the communications source. A program is embodied on the storage device for execution by the processor, and the program has instructions in a plurality of program modules, which include: a monitoring module to monitor the communications source broadcasting unstructured data; a conversion module to generate text from the unstructured data and to store the generated text on a searchable data storage device; an analyzing module to semantically analyze the stored text for semantically relevant text in relation to the search phrase; and a selecting module to select the semantically relevant text.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description.

DETAILED DESCRIPTION OF THE INVENTION

Figure 1:
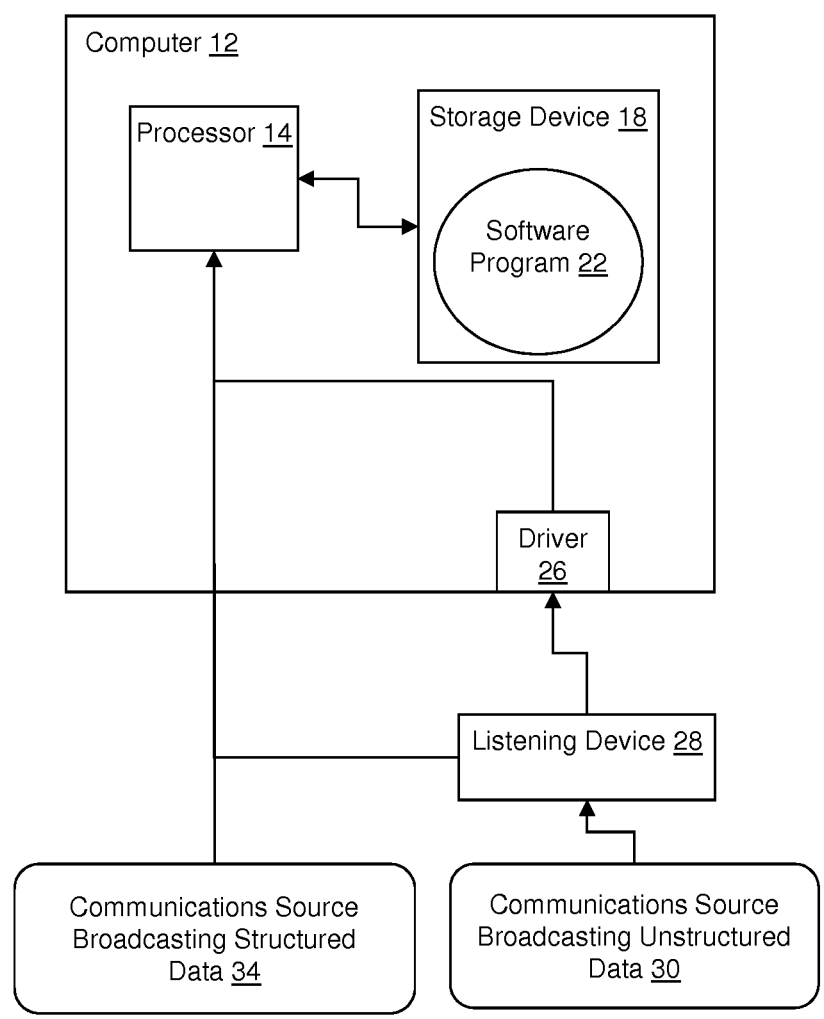
FIG. 1 is a schematic block diagram of an embodiment of a computer system for implementing a method according to an embodiment of the invention.

While the present invention has been particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

Furthermore, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the present invention will now be described in detail with reference to the accompanying drawings.

Figure 2:
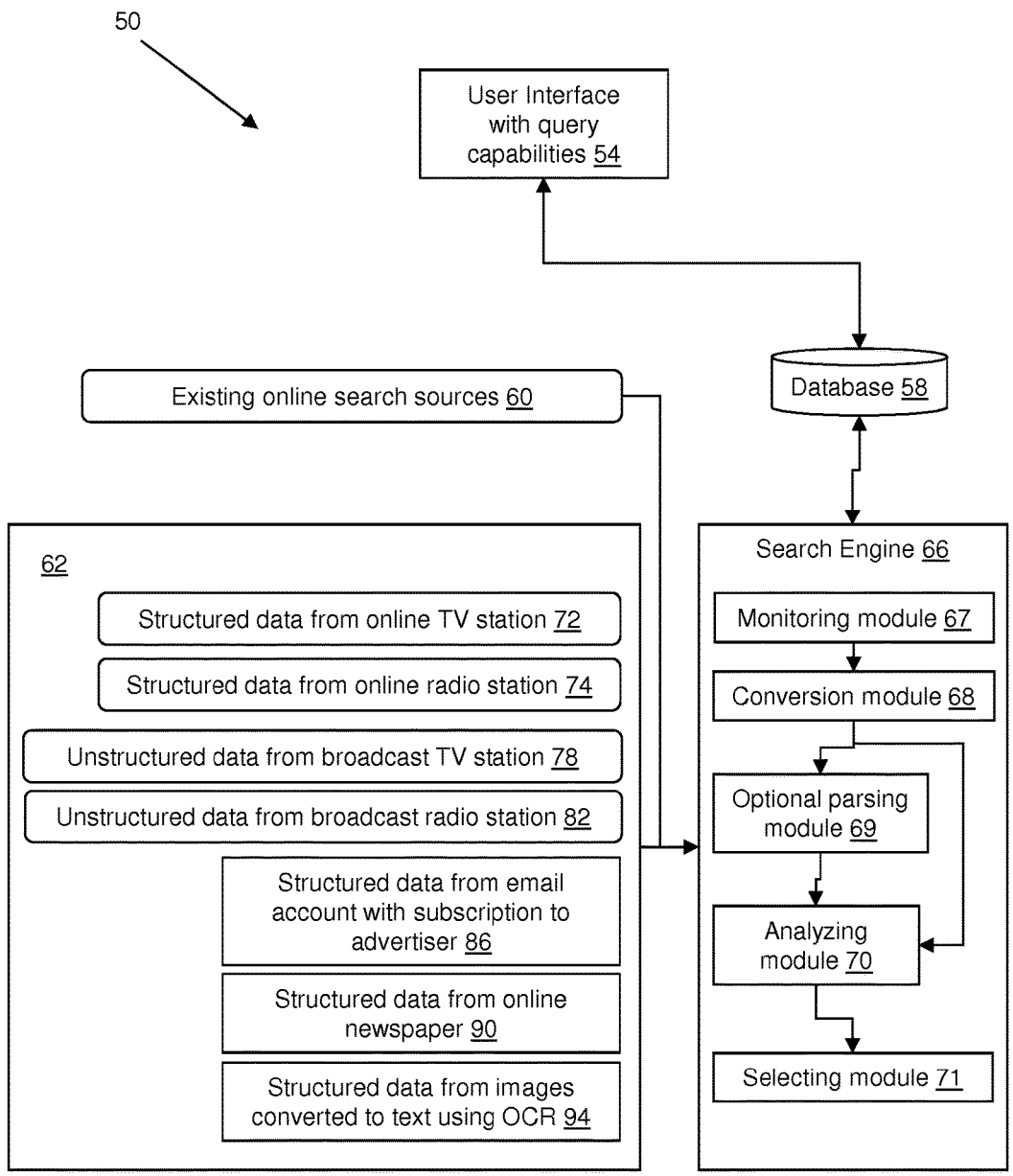
FIG. 2 is a schematic block diagram further detailing the components of the system shown in FIG. 1.

Referring to FIGS. 1 and 2, a system 10 according to an embodiment of the invention includes a software program 22. The software program 22 is stored on a storage device 18 of a computer 12, which includes a processor 14 for executing the steps of a computer program, i.e., the software program 22. The software program may include a user interface 54 allowing access capabilities to the computer 12 by a user. The user interface 54 may include an input field that allows a user to enter a search phrase, and may further include parameters that refine the software program's 22 functioning. For example, the user interface 54 may allow a user to choose the type and number of sources to search or to define a date range limitation to apply to the search results.

The system 10 further includes one or more communications sources that broadcast unstructured data 30 and one or more communications sources that broadcast structured data 34. A communication source may be a system or device that is capable of broadcasting data. In this context, "broadcasting" is not limited to broadcasting of digital or analog signals. These sources are operatively connected to the computer 12 so that the computer 12 can access the broadcast data. Structured data includes data that the software program 22 can access, understand, use, manipulate or otherwise interact with without the need to first convert the data by using a listening device 28. Unstructured data includes data that the software program 22 cannot access, understand, use, manipulate or otherwise interact with without the unstructured data first undergoing a conversion to structured data by using a listening device 28 operatively connected to the computer 12. The term "listening" is not limited to its literal definition, and includes functionality necessary to capture the type of structured or unstructured data broadcast by a communication source. For example, where the broadcast data consists of images, the listening device 28 may be a scanner.

Examples of structured data may include digital text, streaming audio or video, audio or video computer files, digital images, emails, and other computer files, which can be expressed in digital format. Communications sources broadcasting structured data 34 may include computer databases, individual computer files, emails accounts, the Internet, streaming audio or video stations, online newspaper or magazines with subscription capabilities, e-books, or digital voice calls from a call center.

Examples of unstructured data may include broadcast radio or television signals, print newspapers, magazines, catalogues, or brochures. Communications sources broadcasting unstructured data 30 may include radio or television stations transmitting radio and television signals.

Whether structured or unstructured, video data may consist of an audio component and a video component. Therefore, while embodiments of the invention may monitor communications sources broadcasting one or both types of video data, the embodiments process the audio component associated with the video data. In instances where video data does not have an audio component, embodiments of the invention are configured not to process the non-audio data beyond the initial monitoring step.

According to the system 10, and as referenced above, although digital text is one type of structured data, it is not the only type. To be searched by the software program 22, non-textual structured data first is converted to text format. For example, the software program 22 may detect that incoming data from a communications source broadcasting structured data 34 is streaming audio. The software program 22 transcribes the audio into digital text so that the contents of the audio data may be searched and analyzed using the software program's 22 other functions. Similarly, the software program 22 may detect that incoming data from the communications source broadcasting structured data 34 is streaming video. The software program 22 transcribes the audio component of the video into digital text.

According to the system 10, the computer 12 receives structured data from the communications source broadcasting structured data 34 and directs the structured data to the processor 14, where the software program 22 can access and process the structured data. The software program 22 checks the structured data and generates text by converting or transforming the structured data, if the structured data originally is not in text format. Where, for example, the structured data is digital text, the software program need not convert the digital text.

As an additional step, the software program 22 may parse the structured data once it is in text format, using a parsing function. In general, the parsing function of the software program 22 organizes the generated textual data. It includes, without limitation, indexing, sorting, ranking, rating, linking, categorizing, or even selectively ignoring text segments. For example, the software program 22 may categorize text based on a specified criteria. The parsing function may include steps for being configured according to parsing conventions, or in a way suitable for the particular embodiment of the invention, to define the specified criteria. For example, if the invention is implemented as a searching tool in the medical industry, the parsing function of the software program 22 may be configured to process or collect only words or phrases that are relevant to the medical field as the specified criteria, or to organize words according to their medical definitions, rather than their ordinary meaning, as the specified criteria for parsing. If the records searched are patients' medical data, the parsing function may be configured to recognize social security numbers, insurance carriers, and other particularly relevant information likely to be found in the monitored data. As a further example, the parsing function may be configured to recognize and group temporal references. The phrases "on sale through December 31" and "will be on sale the last week of December" may be treated as equivalent and grouped together. The parsing function allows the software program 22 to make more intelligent choices when determining whether collected data is relevant to a search phrase.

The software program 22 is configured to allow a user to define a search phrase. The user need not be a natural person. The user may be another system communicating with the system 10. For example, if implemented as a web service, the system 10 may make its searching capabilities accessible to any system that connects to the web service. The user may even be a module of the software program 22, configured to define search phrases, which other modules of the software program 22 may use to retrieve search results. Furthermore, the search phrase may be defined before, during, or after the software program's monitoring, text generating, storing, or parsing functions.

The software program 22 then semantically analyzes the generated text, or its parsed form, in relation to the search phrase. Semantically analyzing the generated or parsed text includes analyzing the text according to a specified criteria, such as recognition of a particular language. The criteria can be set before or at the time of running the software program 22, or may be set by a user through the user interface 54, if one is implemented in conjunction with the system 10. All three configuration options may also be used. For example, the criteria can be preset to ignore any text that is not in English. Where used in conjunction with a paid service, the criteria can be configured to limit its search query based on the amount of credit available to a user at the time of execution. The software program 22 can be configured to apply a user's selection of language through the user interface 54 to limit or expand the selection of sources to search or the selection of results to return.

The computer 12 also receives unstructured data from a communications source broadcasting unstructured data 30 and directs it to a listening device 28. The listening device is configured to receive unstructured data and convert that data to additional structured data, either internally, such as may be the case in a digital audio recorder; or in conjunction with a driver 26 component, operatively connected to the computer 12. The driver directs the additional structured data, obtained by converting the unstructured data, to the processor 14, where the software program 22 accesses the additional structured data and converts it to text, as described above for the structured data, if the newly converted additional structured data is not originally in text format. The software program 22 proceeds to semantically analyze the converted additional structured data in relation to the search phrase, using the same approach as described above in the case of data from a structured data source 34.

As an example of an embodiment of the disclosure that searches unstructured data, the computer system 10 can be configured to record sound emanating from a conventional radio or a television unit using a listening device 28. The listening device may be an ordinary microphone that is connected into the computer 12 through the driver 26, or it may be a digital audio recorder that works independently of the computer 12 and is later connected to the computer to transfer the structured data it stores. The software program 22 can be configured to transcribe the sound into text once the sound is in structured form. The software program 22 can semantically analyze the transcribed text as is the case with an ordinary text computer file.

After the software program 22 searches and semantically analyzes the structured data (or unstructured data that is converted to structured data), it selects the data that is semantically relevant to the search phrase. The system 10 can be configured to process the selected data according to the particular needs of a given embodiment of the invention. For example, the selected data may be stored in a database, displayed on a monitor, transmitted over a network, or printed on paper.

Further referring to FIG. 2, additional detail is added to the system 10 shown in FIG. 1, including a sub-system 50 according to an embodiment of the invention, which includes a user interface 54 with searching capabilities. The user interface 54 can access a database 58, which stores information collected from existing search sources 60, which may include websites and web advertisement, and a plurality of additional sources 62, comprising: an online TV station 72; an online radio station 74; a broadcast TV station 78; a broadcast radio station 82; an email account 86 configured to receive email advertisements; an online newspaper 90; and one or more images 94 with graphical text components converted to text using OCR software.

The embodiment includes a search engine 66 that crawls and searches the sources referenced above. More particularly, the search engine 66 is configured to include a monitoring module 67 that interacts with the data sources 60, 62; a conversion module 68 that determines whether the data that the monitoring module 67 has obtained is in text format, converts non-textual data to digital text, and generates digital text as output (if the data obtained by the monitoring module 67 is in digital text and requires no conversion, the conversion module 68 generates the same data as output without conversion); an optional parsing module 69 that parses the text generated by the conversion module 68; an analyzing module 70 that semantically analyzes the textual data obtained by the monitoring module 67 and, where appropriate, converted to text by the conversion module 68, in comparison to the search phrase; and a selecting module 71 that processes the results of the analyzing module 70. For example, the selecting module can be configured to store or disregard some or all of the search results, present the search results to the user on a computer screen or, print the search results on paper.

In the case of the online TV station 72 and the online radio station 74, the search engine 66 connects to the streaming data from these sources, transcribes their audio component to text, and stores the text in the database 58. Therefore, in the case of streaming video, it is the audio component of the streaming video data that the search engine 66 receives, transcribes, and stores. The sub-system 50 allows a user to search the data stored in the database 58 by interacting with the user interface 54.

Similarly, the search engine 66 can monitor audio data from the broadcast TV station 78 and broadcast radio station 82, with the aid of a microphone placed in front of TV and radio speakers, respectively, where the audio waves from these sources first are converted to digital audio using a converter. Therefore, in the case of broadcast video, it is the audio component of the broadcast signal that the microphone detects. The microphone and converter may be housed in a single computer, or they may be external.

The embodiment further includes an email account 86 as one of the data sources 62 that the search engine 66 can interact with. The email account 86 can be configured to receive emails that then can be searched. For example, the email account 86 can be submitted to retailers to receive their promotional emails.

The embodiment also includes data from an online newspaper 90, which may be available through a protocol such as an RSS feed or web services. The online newspaper 90 contains structured data, including digital text. By accessing the online newspaper 90, through the Internet or an internal network, the software program 22 retrieves the structured data, obtains any digital text elements and generates digital text from any non textual elements, and processes the data in the same manner as described above with respect to other data sources.

Finally, the embodiment includes image data that is convertible to text using optical character recognition software 94. Such image data may include, without limitation, a digital image of a text document, such as a scanned newspaper, or a digital flyer with graphical text. In the case of the latter, such textual graphics may not be readily recognizable by a computer. Although graphical text may be as intelligible as digital text to the human eye, the same is not true in a computer. Without additional processing, a computer does not distinguish the graphical text from other graphical elements present in the image. Therefore, the search engine's 66 monitoring module 67 accesses image data 94 and passes the data onto the conversion module 68, where images are analyzed using optical character recognition software, incorporated into the conversion module 68, and their graphical text elements are converted to digital text. The resulting data is processed by as is the case with digital text obtained from other sources described above.

Figure 3:
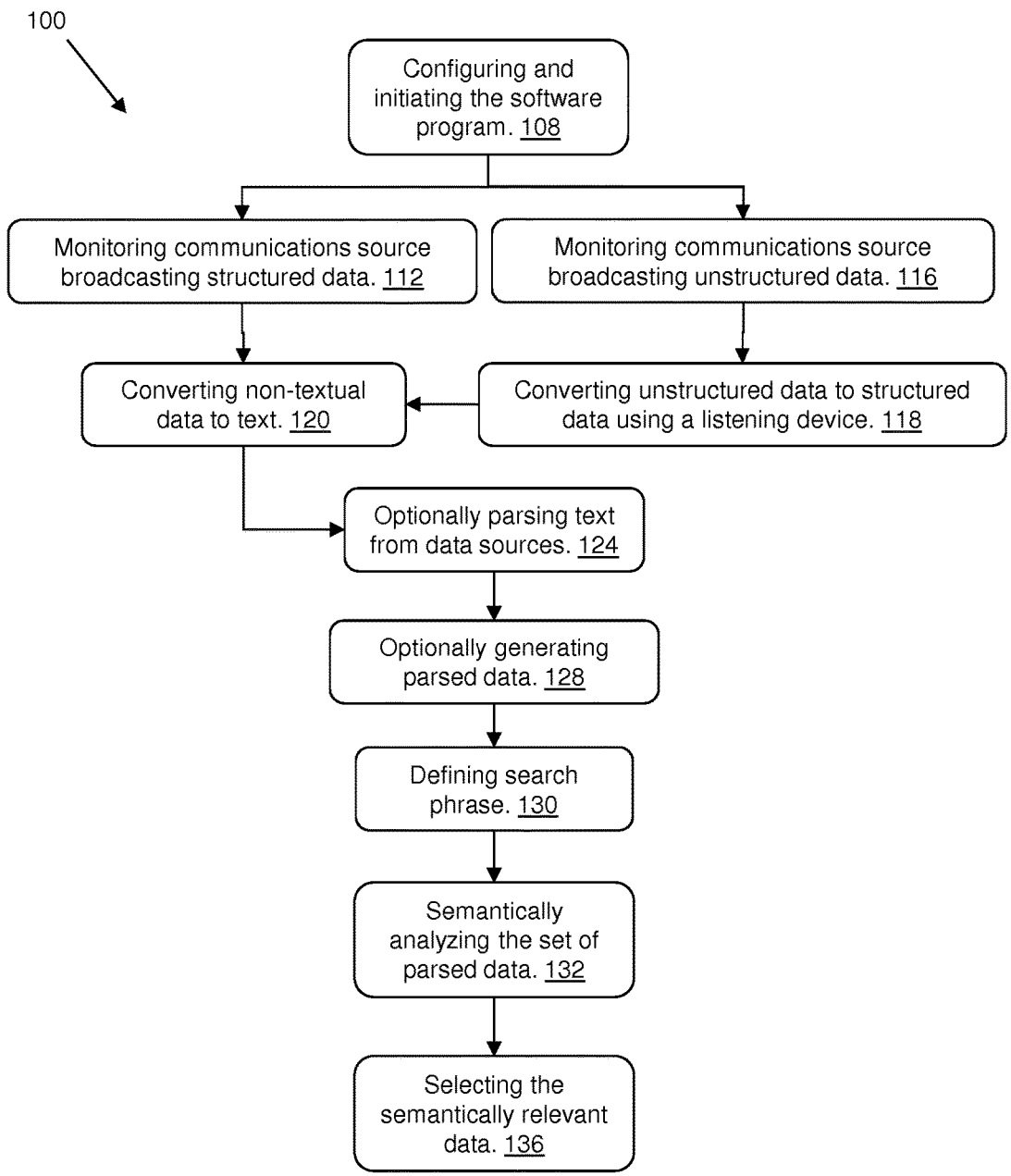
FIG. 3 is a flowchart of a method according to an embodiment of the invention based on the system shown in FIGS. 1 and 2.

Referring to FIG. 3, a method 100 according to an embodiment of the invention is similar to the system 10 described above and uses the system's 10 components for execution of the method 100, and includes configuring the software program 22, which is stored on the computer readable storage device 18 connected to the computer 12. The computer has a processor 14 for executing the software program 22.

In step 108, the software program 22 is initiated using parameters and values that may be preset, set at the time of execution, or set according to user input. For example, the software program 22 may be preset to search only data from advertisements. As a further example, the software program 22 may be configured at the time of initiation, in step 108, to limit the number of sources the software program 22 will search depending on computing resources available to the system that implements the method 100. As a further example, the software program 22 may be configured, according to a user's selection, to return only English language search results.

In steps 112, 116, the method 100 monitors communications sources that broadcast structured and unstructured data, respectively, depending on the method's configuration as described above. The monitoring steps 112, 116 may be initiated and implemented simultaneously or individually. In step 118, unstructured data obtained from monitoring a communication source broadcasting unstructured data in step 116 is converted into structured data. For example, in the monitoring step 116, if the monitored unstructured data consists of analog audio emitting from a radio's speakers, this unstructured data is converted into structured data in step 118, using a listening device 28 and a driver 26, as described above in connection with the implementation of system 10.

Structured data obtained from the monitoring steps 112, 116 is accessible by a computer 12 in the system 10 described above. However, the structured data may be in non-text format, as in the example of analog audio from a radio's speakers converted to digital audio by the monitoring step 116. Therefore, it may be necessary to convert the structured data to text in order to semantically analyze it in conjunction with the search phrase.

Therefore, in step 120, structured data obtained from steps 112 and 116 is analyzed to determine if it is in text format. To the extent that the structured data is not in text format, such structured data is converted to digital text. The text-generation function of step 120 is not limited merely to transcription. For example, the step 120 can be configured to generate a transliteration of audio data that it receives as input. As a further example, the step 120 could entail translating the audio from one language to another.

In the parsing step 124, the method 100 then parses the text generated in step 120. The parsing step 124 may be configured according to parsing conventions, or in a way suitable for a particular embodiment of the invention, as described above with respect to the parsing function of the software program 22.

For example, if the invention is used in the medical industry, the parsing step 124 may be configured to process or collect only words or phrases that are relevant to the medical field, or to group words according to their medical definitions, rather than their ordinary meaning. As a further example, the parsing step 124 may generate an index of the text generated in step 120.

In step 128, the method generates a set of parsed text corresponding to occurrences of the search phrase in the text generated in step 120 and parsed in step 124.

In step 130, a search phrase is defined. The search phrase may be defined by a user, for example, through a user interface with query capabilities 54 as illustrated in FIG. 2. The search phrase may also be defined by an automated process, such as a computer program running on the system 10, or a computer program running on a different system interfacing with the system 10.

In step 132, the method 100 semantically analyzes the set of parsed text generated in step 128 in relation to the search phrase. This can be performed using conditions and parameters that are pre-set, set at the time the method 100 is executed, or set a by a user.

In step 136, the method 100 selects the data generated in step 132. The selected data may be stored, displayed, or otherwise used to satisfy the specific purposes of the embodiment in which method 100 is implemented.

It is not necessary to implement the steps of the method 100 in the specific order outlined above. For example, a user may define a search phrase before any data is collected from a data source. Alternatively, a user may define a search phrase and search only data that already has been collected. In a further embodiment, multiple instances of each step may be implemented concurrently. For example, a computer implementing the method 100 may continuously monitor data sources and allow simultaneous searching of the data collected.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for searching sources of data, comprising steps of:
    capturing unstructured broadcast data from a broadcast source by using a listening device, wherein the broadcast source includes one or more of a television broadcast source and a radio broadcast source;
    converting the captured unstructured broadcast data to a first structured data, the converting comprising detecting an audio component of the captured unstructured broadcast data and converting the audio component to structured text;
    receiving a second structured data from a source different from the broadcast source;
    capturing a digital image from a source different from the second structured data source, wherein the digital image includes graphical text elements recognizable as text by optical character recognition software;
    converting the graphical text elements of the digital image to a third structured data, the third structured data comprising structured text from the graphical text elements;
    generating text of contents of each of the first structured data, the second structured data, and the third structured data and storing the generated text on a searchable data storage device;
    parsing the stored text by (i) collecting only phrases relevant to a specified field and (ii) grouping phrases recognized as comprising temporal references;
    receiving a search phrase and a selection of a particular language from a user;
    semantically analyzing the parsed text by ignoring any text not in the particular language;
    searching the semantically analyzed text using the received search phrase;
    generating search results based on searching the semantically analyzed text; and
    providing the search results for communication to the user.

2. The method of claim 1, further comprises:
    identifying, by the processor, one or more advertisement components of the stored text, wherein the searching is based on the one or more advertisement components.

3. The method of claim 1, wherein the second structured data includes one or more of streaming audio and streaming video.

4. The method of claim 1, wherein the unstructured broadcast data includes one or more of analog audio and analog video having an analog audio component.

5. The method of claim 1, wherein the second structured data includes one or more emails.

* * * * *